Nov. 17, 1925.

E. J. COPELAND

REFRIGERATING APPARATUS

Filed May 5, 1924

1,561,831

3 Sheets—Sheet 3

Edmund J. Copeland
Inventor
by Smith & Freeman
Attorneys

Patented Nov. 17, 1925.

1,561,831

UNITED STATES PATENT OFFICE.

EDMUND J. COPELAND, OF FLINT, MICHIGAN, ASSIGNOR TO COPELAND PRODUCTS, INC., OF FLINT, MICHIGAN, A CORPORATION OF MICHIGAN.

REFRIGERATING APPARATUS.

Application filed May 5, 1924. Serial No. 710,994.

*To all whom it may concern:*

Be it known that I, EDMUND J. COPELAND, a citizen of the United States of America, and a resident of Flint, in the county of Genesee and State of Michigan, have invented certain new and useful Improvements in Refrigerating Apparatus, of which the following is a full, clear, and exact description.

This invention relates to refrigerating apparatus and has for its object the provision of a new and improved tank for use in domestic refrigerators for the purpose of, so to speak, storing the cold produced by the refrigerating apparatus in order to maintain the air in the refrigerating chamber at an approximately constant temperature slightly above the freezing point of water while at the same time producing and maintaining the temperature within a limited region constantly below the freezing point. The particular object of the invention is the provision of such a tank having therein a freezing chamber of sufficient size to receive substantial pieces of meat or the like which is desired to be frozen or to be kept for sufficient period of time to augment its tenderness, or to receive trays of water to be frozen; the provision of a multiple purpose freezing chamber having provisions for receiving ice trays without obstructing the ready cleansing of the freezing chamber; the provision of a freezing chamber of the type described in combination with controlling means so arranged that freezing temperatures may be maintained at all seasons of the year; the provision of a new and improved arrangement of parts for controlling the temperature of the tank, freezing chamber, and surrounding parts; while further objects and advantages of the invention will become apparent as the description proceeds.

Figure 1:
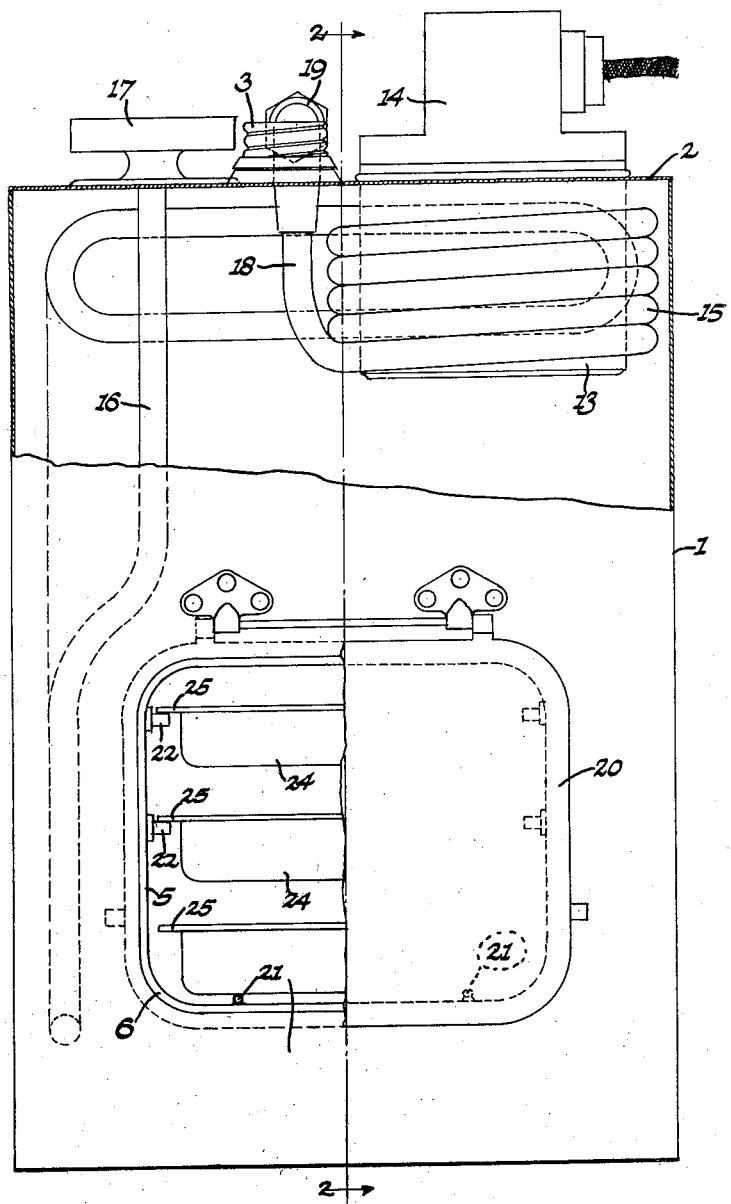
Figure 2:
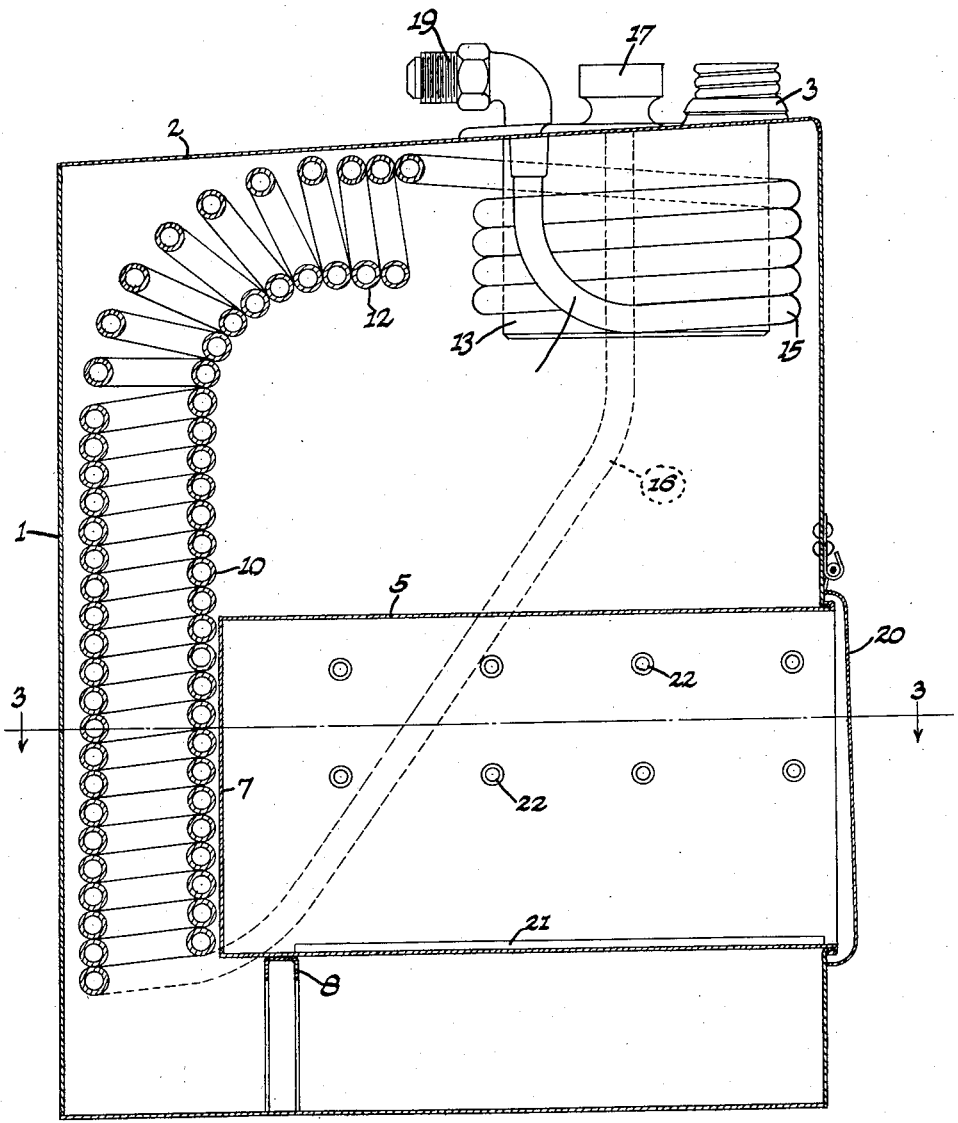
Figure 3:
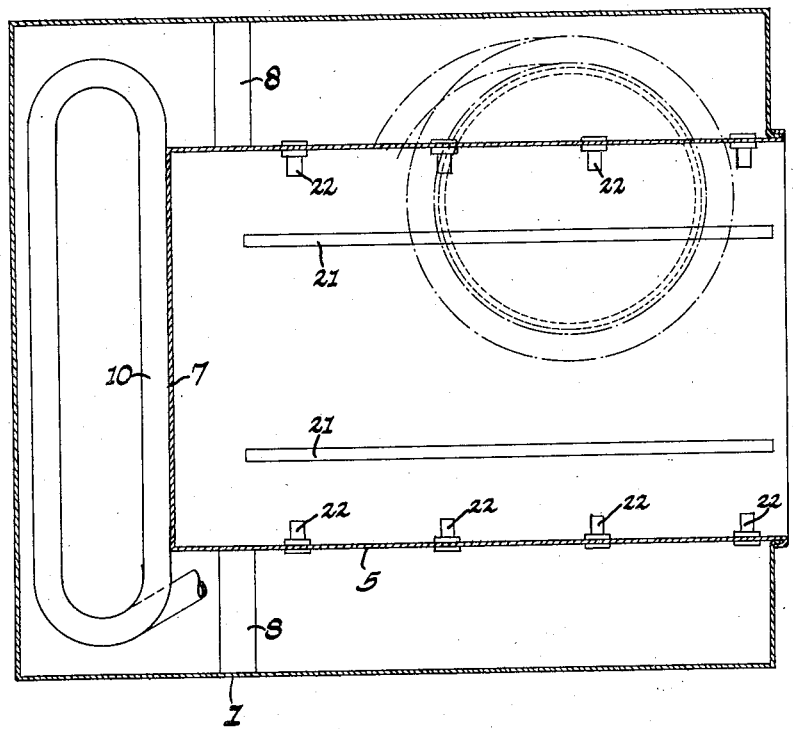
Figure 4:
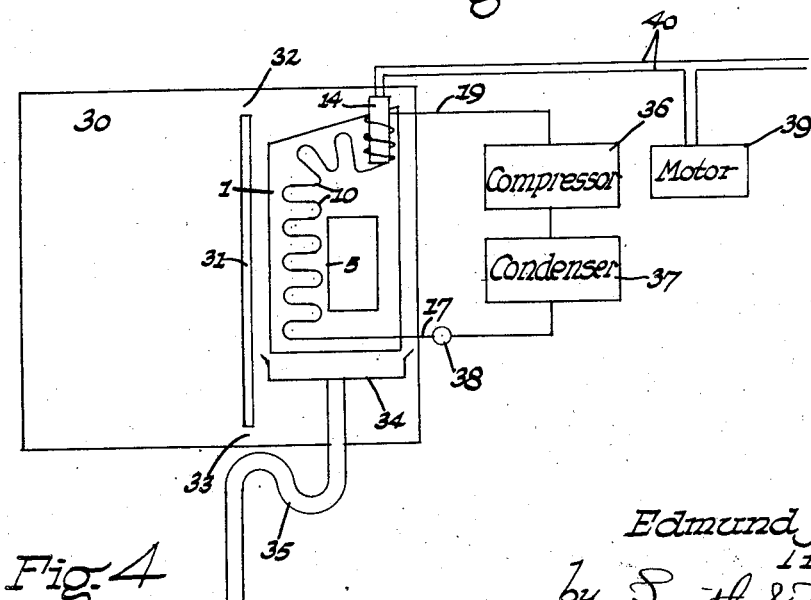

In the drawings accompanying and forming a part of this application I have shown certain physical forms in which my invention can be embodied although it will be understood that these drawings are merely illustrative of the principles of my invention and are not intended to limit me to the particular designs and arrangements therein shown. Fig. 1 is a front elevation of my improved tank, certain parts being broken away; Fig. 2 is a vertical sectional view corresponding to the line 2—2 of Fig. 1; Fig. 3 is a horizontal sectional view corresponding to the line 3—3 of Fig. 2; and Fig. 4 is a diagrammatic view showing the relation between the various parts of the system.

In these drawings I have shown a metal tank 1 adapted for the reception of brine, alcohol solution, or other low freezing point liquid, adapted and arranged to be located in a domestic refrigerator or other box or chamber which is desired to be kept cool. I have retained the terms "brine" and "brine tank" in this specification and claim in accordance with standard practice in the art but intend to designate thereby any low freezing point solution whether or not containing a soluble salt and whether or not the solvent be water. I have shown this box as substantially rectangular in outline excepting that the top or roof 2 is slanted, the filling opening 3 being located at the highest point thus enabling a certain amount of variation in liquid level without bringing the liquid out of contact with the metal top. So long as the cold liquid remains in contact with this top, air currents striking this tank, which because of the cooling effect are always in a downward direction, will become effectively cooled whereas if the liquid falls below the level of the top, an air chamber is formed which insulates the metal from the liquid and hence impedes the cooling of the external air.

Opening through one of the vertical sides of the box is a horizontal rectangular casing 5 defining a freezing chamber. The corners of this chamber are preferably rounded off as indicated at 6 in order to facilitate cleansing and the rear wall 7 of this casing is spaced from the rear wall of the box to define a vertical passageway. Any suitable means such as a cross bar 8 may be employed for supporting the rear end of the casing.

Located at the rear of the tank is a flatted coil 10 of non-corrodible metal tubing extending from a point somewhat spaced from the bottom of the tank to the uppermost part of the same, the turns of this coil being preferably wound rather closely together so as to define a channel for convection currents. At its upper end I have shown the coil as curved gradually to horizontal position at 12, although this is primarily for the purpose of enabling the use of a larger amount of piping inside the space available in the particular tank shown, and by using a taller tank it is sometimes possible to employ a straight coil. Inset in the top of the tank is a hollow sheet metal well 13 opening through the upper wall and constituting a thermostat chamber in which is the thermostat 14. Inside the tank I have shown this well as surrounded by several turns 15 of pipe forming a continuation of the coil 12. The lower end of the coil 10 is connected by an extension 16 with an inlet fitting 17, and the end of the coil 15 is connected by an extension 18 with the outlet fitting 19. Both the inlet and outlet fitting are here shown as located on the top of the tank but this is a matter of convenience rather than of necessity. Preferably the initial turns of the coil are substantially horizontal or at least without pockets, but the thermostat embracing portion is preferably located below some other portion of the coil so as to trap the refrigerant liquid, for a purpose to be described hereafter; however, I do not restrict myself thereto.

Pivoted to the front wall of the casing is a suitable door 20 preferably arranged to be readily removed and adapted when closed to cover the mouth of the freezing chamber. Carried by the bottom wall of this chamber are spacing means adapted to hold vessels out of contact therewith. The preferred means consists of metal rods 21—21 laid lengthwise thereon and soldered in place. The side walls are also preferably formed with provisions for supporting other vessels, the preferred form of these provisions consisting of rivets 22 located in one or more horizontal rows depending upon the height of the chamber. The vessels customarily employed are metal trays 24—24 adapted to contain water which is to be frozen, these trays having rims 25 adapted to rest on these rivets. The bottommost tray rests on the rods 21 and the amount of metallic contact thereby permitted is too small to permit serious freezing of the tray to the chamber floor; likewise the area of contact between the rims and rivets is too small to permit rigid freezing. Likewise this type of construction avoids pockets and crevices in which articles of food can become lodged in case this be used as a cold storage chamber.

The tank is supported in such relation to a provision chamber 30 that convection currents may flow around the same, a partition or shield 31 being preferably interposed and arranged to define air-circulation openings 32 and 33. A drip tray 34 is located beneath the tank and drained through a suitable trap 35. To the outlet 19 is connected a compressor 36 which delivers to a condenser 37 from which the liquefied refrigerant returns to the expansion coil 10 by way of the expansion valve 38. The compressor is operated by the motor 39 connected by wires 40 with a switch controlled by the thermostat, which is generally set to operate at a temperature intermediate the optimum for a provision chamber which should be from 35° to 40° F. and the optimum for freezing water or meat which should be from 20° to 25° F.

The action of the air currents is to warm the upper part of the tank first. The convection currents produced in the tank by the air are feeble and do not seriously affect the freezing chamber. Ultimately the local warming operates the thermostat and starts the motor. The liquid refrigerant now delivered into the inlet 17 begins to evaporate at the bottom of the coil 10, the horizontal nature of the turns preventing entrapment, at least until the action has progressed to a point near the outlet. The local cooling caused by the evaporation of the refrigerant in the coil causes a downward current of the tank liquid to occur through the coil, thereby concentrating the coldest liquid about the freezing chamber. As the tank liquid again becomes chilled, a continuously increasing quantity of liquid refrigerant collects in the lower part of the coil, the upper parts boiling away and passing through the coil 15 in the form of a vapor, which issues substantially at the temperature of the tank liquid. As the action proceeds, however, a time comes when some of this refrigerant liquid is carried around the horizontal turns 12 and into the coil 15 where it is entrapped and can issue through the outlet 19 only by local evaporation which so chills the adjacent thermostat as to operate a switch and stop the compressor. By this time the coil 10 will be found well filled with refrigerant which will continue to evaporate a considerable time despite the growing back pressure caused by the stopping of the compressor. This, together with the submergence of the thermostat in the tank liquid prevents its becoming sufficiently warm to restart the compressor until after a considerable idle period, yet owing to its location in the upper part of that tank it will recommence the freezing action before the freezing chamber, which is lower down in the tank, has become sufficiently warmed to allow its contents to thaw.

With this arrangement it is possible to keep both the provision chamber and the freezing chamber at the desired temperatures with the use of a single thermostat and to operate the apparatus with a minimum waste of power. However, many changes, omissions, additions, and rearrangements may be made without departing from the scope of my invention and I do not limit myself in any wise except as recited in my claim.

Having thus described my invention what I claim is:

In refrigerating apparatus, a brine tank having a freezing chamber opening through the lower part of one of its walls and a thermostat chamber opening through one of its uppermost parts, and a refrigerating coil having its initial portion arranged in upright position in cooling relation relatively to said freezing chamber, and having its terminal portion arranged in cooling relation relatively to said thermostat chamber, the turns of said initial portion being substantially horizontal to prevent trapping of refrigerant therein and a portion of the coil between the two portions being non-horizontal to insure trapping of refrigerant in said terminal portion.

In testimony whereof, I hereunto affix my signature.

EDMUND J. COPELAND.